US012352091B2

(12) United States Patent

Bernhagen et al.

(10) Patent No.: US 12,352,091 B2

(45) Date of Patent: *Jul. 8, 2025

(54) SLIDE OPERATOR FOR FENESTRATION UNIT

(71) Applicant: Pella Corporation, Pella, IA (US)

(72) Inventors: Todd A. Bernhagen, Pella, IA (US); Paul D. Schroder, Pella, IA (US); Ted L. Hansen, Pella, IA (US)

(73) Assignee: Pella Corporation

( * ) Notice: Subject to any disclaimer, the term of this patent is extended or adjusted under 35 U.S.C. 154(b) by 0 days.

This patent is subject to a terminal disclaimer.

(21) Appl. No.: 18/496,535

(22) Filed: Oct. 27, 2023

(65) Prior Publication Data

US 2024/0052682 A1 Feb. 15, 2024

Related U.S. Application Data

(60) Continuation of application No. 17/576,343, filed on Jan. 14, 2022, now Pat. No. 11,802,432, which is a division of application No. 16/670,736, filed on Oct. 31, 2019, now Pat. No. 11,261,640.

(60) Provisional application No. 62/753,491, filed on Oct. 31, 2018.

(51) Int. Cl.
*E05F 11/04* (2006.01)
*E05F 11/34* (2006.01)

(52) U.S. Cl.
CPC .............. *E05F 11/04* (2013.01); *E05F 11/34* (2013.01)

(58) Field of Classification Search
CPC . E05F 11/04; E05F 11/10; E05F 11/14; E05F 11/16; E05F 11/26; E05F 11/34; E05F 15/622; E05F 15/63
See application file for complete search history.

(56) References Cited

U.S. PATENT DOCUMENTS

| | | | |
|---|---|---|---|
| 89,606 | A | 5/1869 | Strongfllow |
| 105,287 | A | 7/1870 | Wood |
| 262,530 | A | 8/1882 | Zacherl |
| 281,865 | A | 7/1883 | Goodwin |
| 327,858 | A | 10/1885 | Bradford |
| 426,792 | A | 4/1890 | Foote |
| 489,442 | A | 1/1893 | Whetter |
| 501,622 | A | 7/1893 | Lee |
| 670,929 | A | 4/1901 | Feder |
| 685,466 | A | 10/1901 | Bradshaw |
| 718,007 | A | 1/1903 | Linn |

(Continued)

FOREIGN PATENT DOCUMENTS

| | | | |
|---|---|---|---|
| CA | 2988151 | A1 | 6/2018 |
| CA | 3081316 | A1 | 11/2020 |

(Continued)

*Primary Examiner* — Justin B Rephann

(74) *Attorney, Agent, or Firm* — FAEGRE DRINKER BIDDLE & REATH

(57) ABSTRACT

Sliding operator assemblies and associated fenestration units, systems, and methods of use and assembly are described. Some such sliding operator assemblies transition a first, linear actuation force along a first axis (e.g., vertical) to a second actuation force along a second axis (e.g., horizontal) to cause a drive mechanism to impart opening and closing forces, respectively, on the sash. Some designs relate to belt-, twisted ribbon-, or band-drive sliding operator assemblies.

14 Claims, 9 Drawing Sheets

(56) References Cited

U.S. PATENT DOCUMENTS 763,240 A 6/1904 Aupke
779,801 A 1/1905 Prden
798,369 A 8/1905 Stutenroth
798,544 A 8/1905 Horssen
812,097 A 2/1906 Stanley et al.
820,960 A 5/1906 Erb
820,961 A 5/1906 Erb
908,394 A 12/1908 Corbeille
928,526 A 7/1909 Loper
956,963 A 5/1910 Harmuth
984,669 A 2/1911 Hedstrom
1,082,663 A 12/1913 Viragh
1,134,203 A 4/1915 Jones
1,152,425 A 9/1915 Lovell
1,184,148 A 5/1916 Teisseire
1,193,211 A 8/1916 Webster
1,198,138 A 9/1916 Lovell
1,214,602 A 2/1917 Smith
1,220,675 A 3/1917 Parson
1,222,293 A 4/1917 Iman
1,282,490 A 10/1918 Sullwold
1,313,401 A 8/1919 Mann
1,325,790 A 12/1919 Kleinschmidt
1,327,441 A 1/1920 Mesker et al.
1,358,121 A 11/1920 Smith
1,361,913 A 12/1920 Sebastian
1,397,859 A 11/1921 Dickens
1,422,552 A * 7/1922 Fournier ................ E05F 11/14 292/276
1,445,267 A 2/1923 Card
1,469,331 A 10/1923 Chester et al.
1,494,948 A 5/1924 Bujack
1,511,363 A 10/1924 Pierson
1,533,725 A 4/1925 Davenport
1,538,222 A 5/1925 Smith
1,601,773 A 10/1926 Sasgen
1,605,883 A 11/1926 Wheelock
1,644,814 A 10/1927 Barr
1,649,861 A 11/1927 Schneider
1,651,697 A 12/1927 Hadden
1,694,886 A 12/1928 McClellan
1,707,888 A 4/1929 White
1,708,556 A 4/1929 Storms
1,748,662 A 2/1930 Stewart
1,777,793 A 10/1930 Grunhut
1,835,558 A 12/1931 Campbell
1,899,466 A 2/1933 Kistner
1,924,557 A 8/1933 Johnson
1,988,810 A 1/1935 Ross
2,114,645 A * 4/1938 Van Benschoten ..... E05F 11/14 49/320
2,405,887 A 8/1946 Hoffman
2,545,449 A 3/1951 Curley
2,788,098 A 4/1957 Bianco
2,943,345 A 7/1960 Ammerman
3,103,351 A 9/1963 Ahlgren
3,117,351 A 1/1964 Ahlgren
3,157,224 A 11/1964 Spargur et al.
3,286,301 A 11/1966 Skolnik
3,330,071 A 7/1967 Kubisiak
3,337,992 A 8/1967 Tolson
3,456,387 A 7/1969 Tolson
4,037,483 A 7/1977 Nadal
4,266,371 A 5/1981 Erdman et al.
4,377,969 A 3/1983 Nelson
4,382,349 A 5/1983 Dunphy et al.
4,703,960 A 11/1987 Lense
4,937,976 A 7/1990 Tucker et al.
5,144,770 A 9/1992 Kraus et al.
5,267,416 A 12/1993 Davis
5,313,737 A 5/1994 Midas
5,435,101 A 7/1995 Garries
5,502,925 A 4/1996 Gorrell
5,509,234 A 4/1996 Klimek et al.
5,531,045 A 7/1996 Piltingsrud
5,553,420 A 9/1996 Klimek
5,560,148 A 10/1996 Chang
5,568,702 A 10/1996 Frank et al.
5,568,703 A 10/1996 Frank et al.
5,581,941 A 12/1996 Sill et al.
5,615,522 A 4/1997 Tomanek
5,636,476 A 6/1997 Eikmeier et al.
5,682,710 A 11/1997 Davies et al.
5,687,506 A 11/1997 Davies et al.
5,715,631 A 2/1998 Kailian et al.
5,775,028 A 7/1998 Lambert
5,813,171 A 9/1998 Piltingsrud
5,815,984 A 10/1998 Sheets et al.
5,826,377 A 10/1998 Simson et al.
5,839,229 A 11/1998 Briggs et al.
5,881,498 A 3/1999 Goggin et al.
5,937,582 A 8/1999 Taylor
5,946,857 A 9/1999 Davies et al.
5,996,668 A 12/1999 Deblock et al.
6,076,304 A 6/2000 Carrier
6,115,884 A 9/2000 Dejong et al.
6,122,863 A 9/2000 Tippin et al.
6,139,070 A 10/2000 Piltingsrud
6,161,336 A 12/2000 Ziv-Av
6,209,364 B1 4/2001 Collet et al.
6,209,610 B1 4/2001 Davies et al.
6,267,168 B1 7/2001 Davies et al.
6,270,175 B1 8/2001 Sfeir
6,314,681 B1 11/2001 Moody
6,328,090 B1 12/2001 Anderson et al.
D453,214 S 1/2002 Komatsubara et al.
6,343,436 B1 2/2002 Milano et al.
6,354,639 B1 3/2002 Minter et al.
6,367,853 B1 4/2002 Briggs
6,381,080 B1 4/2002 Holdener et al.
6,384,990 B1 5/2002 Holdener et al.
6,405,781 B2 6/2002 Davies et al.
6,425,611 B1 7/2002 Minter et al.
6,431,620 B2 8/2002 Tremblay et al.
6,442,898 B1 9/2002 Wu
6,446,391 B1 9/2002 Timothy
6,460,294 B1 10/2002 Harkins
6,484,445 B2 11/2002 Chang
6,546,671 B2 4/2003 Mitchell et al.
6,601,633 B2 8/2003 Sun et al.
6,619,707 B2 9/2003 Sucu et al.
6,637,287 B2 10/2003 Griffin
6,679,002 B2 1/2004 Davies et al.
6,736,185 B2 5/2004 Smith et al.
6,782,661 B2 8/2004 Manzella
6,817,142 B2 11/2004 Marshik
6,871,884 B2 3/2005 Hoffmann et al.
6,871,885 B2 3/2005 Goldenberg et al.
6,890,028 B2 5/2005 Pal et al.
6,915,608 B2 7/2005 Labarre
6,926,363 B2 8/2005 Yamashita
6,968,646 B2 11/2005 Goldenberg et al.
7,013,603 B2 3/2006 Eenigenburg et al.
7,017,301 B2 3/2006 Balbo Di Vinadio
7,021,360 B2 4/2006 Schroder et al.
7,024,821 B2 4/2006 Lu
7,036,274 B2 5/2006 Carrier
7,048,312 B2 5/2006 Brunner
7,066,233 B2 6/2006 Scharff et al.
7,100,327 B2 9/2006 Rangabasyam et al.
7,147,255 B2 12/2006 Goldenberg et al.
7,159,908 B2 1/2007 Liang
7,168,475 B2 1/2007 Colson et al.
7,174,941 B2 2/2007 Schroder et al.
7,216,401 B2 5/2007 Bae
7,246,411 B2 7/2007 Campbell et al.
7,246,840 B2 7/2007 Gates et al.
7,257,864 B2 8/2007 Liang et al.
D558,024 S 12/2007 Tremble et al.
7,305,800 B1 12/2007 Calfee
D559,078 S 1/2008 Baczuk et al.
D560,112 S 1/2008 Baczuk et al.
7,325,359 B2 2/2008 Vetter
7,396,054 B2 7/2008 Carrier

(56) References Cited

U.S. PATENT DOCUMENTS

| | | | |
|---|---|---|---|
| 7,412,800 | B2 | 8/2008 | Maier |
| 7,441,811 | B2 | 10/2008 | Lawrence |
| 7,464,619 | B2 | 12/2008 | Vetter |
| 7,543,623 | B2 | 6/2009 | Allardyce et al. |
| 7,614,184 | B2 | 11/2009 | Rebel et al. |
| 7,617,707 | B2 | 11/2009 | Chiang |
| 7,913,456 | B2 | 3/2011 | Balbo Di Vinadio |
| 7,954,313 | B2 | 6/2011 | Hirata et al. |
| 7,963,577 | B2 | 6/2011 | Wolf |
| 7,971,392 | B2 | 7/2011 | Seo |
| 8,046,954 | B2 | 11/2011 | Curtis et al. |
| 8,051,604 | B2 | 11/2011 | Diekmann et al. |
| 8,087,322 | B1 | 1/2012 | Morris |
| 8,156,612 | B2 | 4/2012 | Yamashita |
| 8,171,673 | B2 | 5/2012 | Helms |
| 8,182,001 | B2 | 5/2012 | Tremble et al. |
| 8,205,658 | B1 | 6/2012 | Lin |
| 8,281,458 | B2 | 10/2012 | Balbo Di Vinadio |
| 8,308,204 | B2 | 11/2012 | Lindgren et al. |
| 8,336,930 | B2 | 12/2012 | Liang et al. |
| 8,347,936 | B2 | 1/2013 | Martin et al. |
| 8,376,019 | B2 | 2/2013 | Van et al. |
| 8,418,404 | B2 | 4/2013 | Gramstad et al. |
| 8,434,265 | B1 | 5/2013 | Campbell et al. |
| 8,448,996 | B2 | 5/2013 | Lake et al. |
| 8,474,186 | B2 | 7/2013 | Dufour et al. |
| 8,490,330 | B2 | 7/2013 | Lund et al. |
| 8,511,724 | B2 | 8/2013 | Liang et al. |
| 8,550,506 | B2 | 10/2013 | Nakanishi et al. |
| 8,602,463 | B2 | 12/2013 | Keighley et al. |
| 8,657,347 | B2 | 2/2014 | Liang et al. |
| 8,683,746 | B2 | 4/2014 | Lambertini |
| 8,707,621 | B2 | 4/2014 | Curtis et al. |
| 8,726,572 | B2 | 5/2014 | Derham |
| 8,727,395 | B2 | 5/2014 | Nania |
| 8,733,021 | B2 | 5/2014 | Lambertini |
| 8,769,872 | B2 | 7/2014 | Maltaverne et al. |
| 8,789,857 | B2 | 7/2014 | Liang et al. |
| D712,280 | S | 9/2014 | Radomyselski et al. |
| 8,899,632 | B2 | 12/2014 | Tremble et al. |
| 8,919,699 | B2 | 12/2014 | Kress et al. |
| 8,925,150 | B2 | 1/2015 | Pacini |
| 8,935,887 | B2 | 1/2015 | Cavalcante |
| 9,062,487 | B2 | 6/2015 | Perry et al. |
| 9,109,384 | B2 | 8/2015 | Minter et al. |
| 9,121,220 | B2 * | 9/2015 | Zhang ..................... E06B 9/264 |
| 9,163,437 | B1 | 10/2015 | Lawrence |
| 9,169,691 | B2 | 10/2015 | Berger |
| 9,234,374 | B2 | 1/2016 | Wolf et al. |
| 9,273,763 | B2 | 3/2016 | Evensen |
| 9,441,714 | B2 | 9/2016 | Hsu et al. |
| 9,441,840 | B2 | 9/2016 | Deng |
| D795,848 | S | 8/2017 | Zheng et al. |
| 9,745,784 | B1 | 8/2017 | Lawrence |
| 9,759,001 | B2 | 9/2017 | Bisang et al. |
| 9,772,010 | B2 | 9/2017 | Dodge et al. |
| 9,784,025 | B2 | 10/2017 | Minter et al. |
| D808,256 | S | 1/2018 | Muller |
| 9,889,725 | B2 | 2/2018 | Boesel et al. |
| 10,119,318 | B1 | 11/2018 | Wolf et al. |
| 10,577,848 | B2 | 3/2020 | Rodems et al. |
| 10,676,977 | B2 | 6/2020 | Erickson et al. |
| 10,876,343 | B2 | 12/2020 | Erickson et al. |
| 11,002,057 | B1 | 5/2021 | Micinski et al. |
| 11,480,001 | B2 | 10/2022 | Erickson et al. |
| 11,560,746 | B2 | 1/2023 | Bernhagen et al. |
| 2001/0000878 | A1 | 5/2001 | Davies et al. |
| 2001/0011579 | A1 | 8/2001 | Davies et al. |
| 2001/0019211 | A1 | 9/2001 | Tremblay et al. |
| 2001/0027621 | A1 | 10/2001 | Davies et al. |
| 2002/0066162 | A1 | 6/2002 | Klompenburg et al. |
| 2002/0116874 | A1 | 8/2002 | Marshik |
| 2002/0119000 | A1 | 8/2002 | Gledhill |
| 2002/0124468 | A1 | 9/2002 | Manzella |
| 2002/0144465 | A1 | 10/2002 | Chang |
| 2002/0145291 | A1 | 10/2002 | Goldenberg et al. |
| 2002/0162223 | A1 | 11/2002 | Reichert |
| 2002/0167180 | A1 | 11/2002 | Sucu et al. |
| 2003/0014920 | A1 | 1/2003 | Lu |
| 2003/0024168 | A1 | 2/2003 | Mitchell et al. |
| 2003/0047949 | A1 | 3/2003 | Brunner |
| 2003/0079414 | A1 | 5/2003 | Rangabasyam et al. |
| 2003/0089190 | A1 | 5/2003 | Griffin |
| 2003/0110699 | A1 | 6/2003 | Eenigenburg et al. |
| 2003/0110701 | A1 | 6/2003 | Dawson |
| 2003/0122409 | A1 | 7/2003 | Pal et al. |
| 2003/0159477 | A1 | 8/2003 | Hoffmann et al. |
| 2003/0172591 | A1 | 9/2003 | Labarre |
| 2004/0011475 | A1 | 1/2004 | Smith et al. |
| 2004/0011476 | A1 | 1/2004 | Schroder et al. |
| 2004/0036299 | A1 | 2/2004 | Goldenberg et al. |
| 2004/0036300 | A1 | 2/2004 | Goldenberg et al. |
| 2004/0128914 | A1 | 7/2004 | Hempelmann |
| 2004/0183314 | A1 | 9/2004 | Klompenburg et al. |
| 2004/0216381 | A1 | 11/2004 | Clavet |
| 2004/0216541 | A1 | 11/2004 | Vetter |
| 2004/0245801 | A1 | 12/2004 | Gates et al. |
| 2004/0261320 | A1 | 12/2004 | Sullivan |
| 2005/0011049 | A1 | 1/2005 | Muir |
| 2005/0022941 | A1 | 2/2005 | Di Vinadio |
| 2005/0046260 | A1 | 3/2005 | Yamashita |
| 2005/0055804 | A1 | 3/2005 | Liang et al. |
| 2005/0072075 | A1 | 4/2005 | Maier |
| 2005/0072088 | A1 | 4/2005 | Colson et al. |
| 2005/0078818 | A1 | 4/2005 | Bae |
| 2005/0103449 | A1 | 5/2005 | Scharff et al. |
| 2005/0132532 | A1 | 6/2005 | Campbell et al. |
| 2005/0198905 | A1 | 9/2005 | Carrier |
| 2005/0218658 | A1 | 10/2005 | Lawrence |
| 2005/0262769 | A1 | 12/2005 | Vetter |
| 2005/0284584 | A1 | 12/2005 | Schroder et al. |
| 2006/0032143 | A1 | 2/2006 | Johnson |
| 2006/0053692 | A1 | 3/2006 | Rebel et al. |
| 2006/0087130 | A1 | 4/2006 | Liang |
| 2006/0118250 | A1 | 6/2006 | Jin et al. |
| 2006/0130980 | A1 | 6/2006 | Gromotka et al. |
| 2006/0169418 | A1 | 8/2006 | Gromotka et al. |
| 2006/0218864 | A1 | 10/2006 | Blomqvist |
| 2006/0225847 | A1 | 10/2006 | Davies et al. |
| 2006/0244269 | A1 | 11/2006 | Rotondi |
| 2006/0244270 | A1 | 11/2006 | Rotondi |
| 2006/0260431 | A1 | 11/2006 | Gill |
| 2007/0020091 | A1 | 1/2007 | Giaimo et al. |
| 2007/0020092 | A1 | 1/2007 | Giaimo et al. |
| 2007/0040396 | A1 | 2/2007 | Carrier |
| 2007/0137110 | A1 | 6/2007 | Liles, Jr. |
| 2007/0137798 | A1 | 6/2007 | Colson et al. |
| 2007/0158953 | A1 | 7/2007 | Liang |
| 2008/0000164 | A1 | 1/2008 | Erickson et al. |
| 2008/0001413 | A1 | 1/2008 | Lake et al. |
| 2008/0029226 | A1 | 2/2008 | Huang |
| 2008/0040978 | A1 | 2/2008 | Diekmann et al. |
| 2008/0092446 | A1 | 4/2008 | Bienek |
| 2008/0120915 | A1 | 5/2008 | Flores |
| 2008/0129054 | A1 | 6/2008 | Tremble et al. |
| 2008/0178424 | A1 | 7/2008 | Tuller |
| 2008/0229667 | A1 | 9/2008 | Dufour et al. |
| 2008/0245488 | A1 | 10/2008 | Colson et al. |
| 2008/0250719 | A1 | 10/2008 | Griffin et al. |
| 2008/0256874 | A1 | 10/2008 | Curtis et al. |
| 2009/0013605 | A1 | 1/2009 | Seo |
| 2009/0025301 | A1 | 1/2009 | Di Vinadio |
| 2009/0079202 | A1 | 3/2009 | Wolf |
| 2009/0120070 | A1 | 5/2009 | Hirata et al. |
| 2009/0146436 | A1 | 6/2009 | Lindgren et al. |
| 2010/0050524 | A1 | 3/2010 | Helms |
| 2010/0089190 | A1 | 4/2010 | Busch |
| 2010/0139039 | A1 | 6/2010 | Balbo Di Vinadio |
| 2010/0192643 | A1 | 8/2010 | Liang et al. |
| 2010/0269987 | A1 | 10/2010 | Martin et al. |
| 2010/0276947 | A1 | 11/2010 | Keighley et al. |
| 2010/0293748 | A1 | 11/2010 | Yamashita |
| 2010/0307064 | A1 | 12/2010 | Lambertini |
| 2010/0327610 | A1 | 12/2010 | Nakanishi et al. |

(56) References Cited

U.S. PATENT DOCUMENTS

| | | | |
|---|---|---|---|
| 2011/0062727 | A1 | 3/2011 | Liang et al. |
| 2011/0068124 | A1 | 3/2011 | Reynolds et al. |
| 2011/0298225 | A1 | 12/2011 | Liang et al. |
| 2012/0023826 | A1 | 2/2012 | Curtis et al. |
| 2012/0068478 | A1 | 3/2012 | Nania |
| 2012/0167469 | A1 | 7/2012 | Maltaverne et al. |
| 2012/0174487 | A1 | 7/2012 | Lambertini |
| 2012/0180392 | A1 | 7/2012 | Lambertini |
| 2012/0297683 | A1 | 11/2012 | Cavalcante |
| 2012/0313387 | A1 | 12/2012 | Liang et al. |
| 2013/0104458 | A1 | 5/2013 | Leung et al. |
| 2013/0111819 | A1 | 5/2013 | Tremble et al. |
| 2013/0214545 | A1 | 8/2013 | Wolf et al. |
| 2013/0220043 | A1 | 8/2013 | Hsu et al. |
| 2013/0256458 | A1 | 10/2013 | Kress et al. |
| 2013/0312331 | A1 | 11/2013 | Bourgoin |
| 2013/0312645 | A1 | 11/2013 | Deng |
| 2014/0007378 | A1 | 1/2014 | Pacini |
| 2014/0007720 | A1 | 1/2014 | Evensen |
| 2014/0069016 | A1 | 3/2014 | Perry et al. |
| 2014/0259940 | A1 | 9/2014 | Meves et al. |
| 2015/0013230 | A1 | 1/2015 | Balbo Di Vinadio |
| 2015/0114176 | A1 | 4/2015 | Bisang et al. |
| 2015/0191956 | A1 | 7/2015 | Minter et al. |
| 2015/0197976 | A1 | 7/2015 | Talbot |
| 2016/0145911 | A1 | 5/2016 | Boesel et al. |
| 2016/0369549 | A1 | 12/2016 | Dodge et al. |
| 2017/0067644 | A1 | 3/2017 | Deng |
| 2017/0107750 | A1 | 4/2017 | Carrier |
| 2017/0198512 | A1 | 7/2017 | Gramstad |
| 2017/0306682 | A1 | 10/2017 | McInnis et al. |
| 2018/0163450 | A1 | 6/2018 | Erickson et al. |
| 2018/0163451 | A1 | 6/2018 | Erickson et al. |
| 2020/0131832 | A1 | 4/2020 | Bernhagen et al. |
| 2020/0370355 | A1 | 11/2020 | Bernhagen et al. |
| 2021/0079707 | A1 | 3/2021 | Erickson et al. |
| 2022/0205299 | A1 | 6/2022 | Bernhagen et al. |
| 2023/0018562 | A1 | 1/2023 | Erickson et al. |
| 2023/0123160 | A1 | 4/2023 | Bernhagen et al. |
| 2024/0052682 | A1 | 2/2024 | Bernhagen et al. |

FOREIGN PATENT DOCUMENTS

| | | | |
|---|---|---|---|
| CN | 101080542 | A | 11/2007 |
| CN | 101131061 | A | 2/2008 |
| CN | 104712229 | A | 6/2015 |
| DE | 20316561 | U1 | 1/2004 |
| DE | 102007002650 | A1 | 7/2008 |
| DE | 102009007686 | A1 | 4/2010 |
| DE | 102010000158 | A1 | 9/2010 |
| EP | 0740041 | A1 | 10/1996 |
| EP | 1092829 | A2 | 4/2001 |
| EP | 1241311 | A2 | 9/2002 |
| EP | 1505242 | A1 | 2/2005 |
| EP | 1688571 | B1 | 12/2008 |
| EP | 2735677 | A1 | 5/2014 |
| GB | 2475507 | A | 5/2011 |
| GB | 2520340 | A | 5/2015 |
| JP | 2003-041834 | A | 2/2003 |
| JP | 2006-063557 | A | 3/2006 |

* cited by examiner

SLIDE OPERATOR FOR FENESTRATION UNIT

CROSS-REFERENCE TO RELATED APPLICATION

This present application is a continuation of U.S. application Ser. No. 17/576,343, filed Jan. 14, 2022, which is a divisional of U.S. application Ser. No. 16/670,736, filed Oct. 31, 2019, which claims priority to Provisional Application No. 62/753,491, filed Oct. 31, 2018, all of which are herein incorporated by reference in their entirety.

FIELD

The present disclosure relates generally to slide operators for fenestration units, and specifically to slide operators for hinged fenestration units.

BACKGROUND

A casement window has a sash that is attached to its frame by one or more hinges at the side of the frame, or window jamb. Window sashes hinged at the top, or head of the frame, are referred to as awning windows, and ones hinged at the bottom, or sill of the frame, are called hopper windows. Any of these configurations may be referred to simply as hinged fenestration units, or pivoting fenestration units.

Typically, such hinged fenestration units are opened by simply pushing on the sash directly, or through use of hardware including cranks, levers, or cam handles. In various examples, operators are placed around hand height or at the bottom/sill of the unit. Such operators typically require a user to impart a swinging or rotational motion with some form of crank handle. This type of operator hardware may have one or more undesirable traits for some hinged fenestration unit designs, including requisite location (e.g., sill, interiorly protruding), associated appearance (e.g., crank style), or form of operability (e.g., rotating/cranking/swinging).

SUMMARY

Various examples from this disclosure relate to sliding operator assemblies and associated fenestration units, systems, and methods of use and assembly. Some aspects relate to sliding operator assemblies that transition a first, linear actuation force along a first axis (e.g., vertical) to a second actuation force along a second axis (e.g., horizontal) that is angularly offset from the first axis to cause a drive mechanism to impart opening and closing forces, respectively, on the sash. Some examples relate to belt-, twisted wire-, or band-drive sliding operator assemblies. Advantages include the ability to have a low-profile actuator that does not substantially project into the viewing area or otherwise impede a view of the fenestration unit, has reduced operating forces, and/or has enhanced handle positioning, although any of a variety of additional or alternative features and advantages are contemplated and will become apparent with reference to the disclosure and figures that follow.

According to a first example, ("Example 1"), a fenestration unit includes a frame having a head, a first jamb, a second jamb, and a sill; a sash hinged to the frame such that the sash pivotable between an open position and a closed position; and an operator assembly configured to transition the sash between the open and closed positions, the operator assembly including, a drive mechanism configured to impart an opening force on the sash toward the open position and a closing force on the sash toward the closed position, and a slide mechanism operatively coupled to the drive mechanism, the slide mechanism being slidable to cause the drive mechanism to impart the opening force and the closing force, respectively, on the sash.

According to a second example further to Example 1 ("Example 2"), the slide mechanism is associated with the frame and includes a handle that is slidable along the frame to cause the drive mechanism to impart the opening force and the closing force, respectively, on the sash.

According to a third example further to Examples 1 or 2 ("Example 3"), the drive mechanism includes a rotary gearbox and a linkage assembly operatively coupled between the rotary gearbox and the sash.

According to a fourth example further to any one of Examples 1 to 3 ("Example 4"), wherein the rotary gearbox includes a worm and a worm gear.

According to a fifth example further to any one of Examples 1 to 4 ("Example 5"), the slide mechanism is slidable along a first axis resulting in an actuation force on the drive mechanism to impart the opening force and the closing force, respectively, on the sash, wherein the resultant actuation force is along a second axis that is at an angle to the first axis.

According to a sixth example further to any one of Examples 1 to 5 ("Example 6"), the first and second axes are generally perpendicular.

According to a seventh example further to any one of Examples 1 to 6 ("Example 7"), the operator assembly further comprises a transfer mechanism including a drive belt operatively coupling the slide mechanism to the drive mechanism.

According to an eighth example further to any one of Examples 1 to 7 ("Example 8"), the drive belt extends along a portion of the frame associated with the slide mechanism, and then along another portion of the frame with which the drive mechanism is associated.

According to a ninth example further to any one of Examples 1 to 6 ("Example 9"), the operator assembly includes a transfer mechanism including a twisted-wire and a gearing coupled to the twisted-wire, and further wherein the slide mechanism includes a handle slidable along the twisted-wire to impart a rotational force on the twisted-wire that is transferred to the drive mechanism.

According to a tenth example further to any one of Examples 1 to 6 ("Example 10"), the operator assembly includes a transfer mechanism including a twisted-wire and a transfer block coupled to the twisted-wire, and further wherein the slide mechanism includes a handle slidable to impart a rotational force on the twisted-wire that is transferred through a perpendicular angle to the drive mechanism through the transfer block.

An eleventh example, ("Example 11"), relates to a method of operating a fenestration unit including a frame, a sash hinged to the frame, and an operator assembly for pivoting the sash an open position and a closed position, the method including sliding a handle of a slide mechanism of the operator assembly in a first direction, the slide mechanism being operatively coupled to a drive mechanism of the operator assembly such that sliding the handle of the slide mechanism in the first direction causes the drive mechanism to impart an opening force on the sash toward the open position. And, the method includes sliding the handle of the slide mechanism in a second direction causes the drive mechanism to impart a closing force on the sash.

A twelfth example, ("Example 12") relates to a method of assembling a fenestration unit, the method including hinging a sash to a frame having a head, a first jamb, a second jamb, and a sill, the sash being pivotable between an open position and a closed position. And, the method includes coupling an operator assembly to the frame and the sash by coupling a drive mechanism between the frame and the sash, the drive mechanism configured to impart an opening force on the sash toward the open position and a closing force on the sash toward the closed position, and coupling a slide mechanism to the frame, as well as operatively coupling the slide mechanism to the drive mechanism such that the slide mechanism is slidable and causes the drive mechanism to impart the opening force and the closing force, respectively, on the sash.

According to a thirteenth example further to Example 12 ("Example 13"), the slide mechanism includes a track, the method further comprising associating the track with the frame such that a handle of the slide mechanism is slidable along the track in order to cause the drive mechanism to impart the opening force and the closing force, respectively, on the sash.

According to a fourteenth example further to Examples 12 or 13 ("Example 14"), the method further comprises operatively coupling a linkage assembly between a rotary gearbox of the drive mechanism and the sash.

According to a fifteenth example further to Example 14 ("Example 15), the rotary gearbox includes a worm and a worm gear.

According to a sixteenth example further to any one of Examples 12 to 14 ("Example 16"), the slide mechanism is slidable along a first axis resulting in an actuation force on the drive mechanism to impart the opening force and the closing force, respectively, on the sash, wherein the resultant actuation force is along a second axis that is at an angle to the first axis.

According to a seventeenth example further to Example 16 ("Example 17"), the first and second axes are perpendicular.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description explain the principles of the disclosure.

Figure 1:
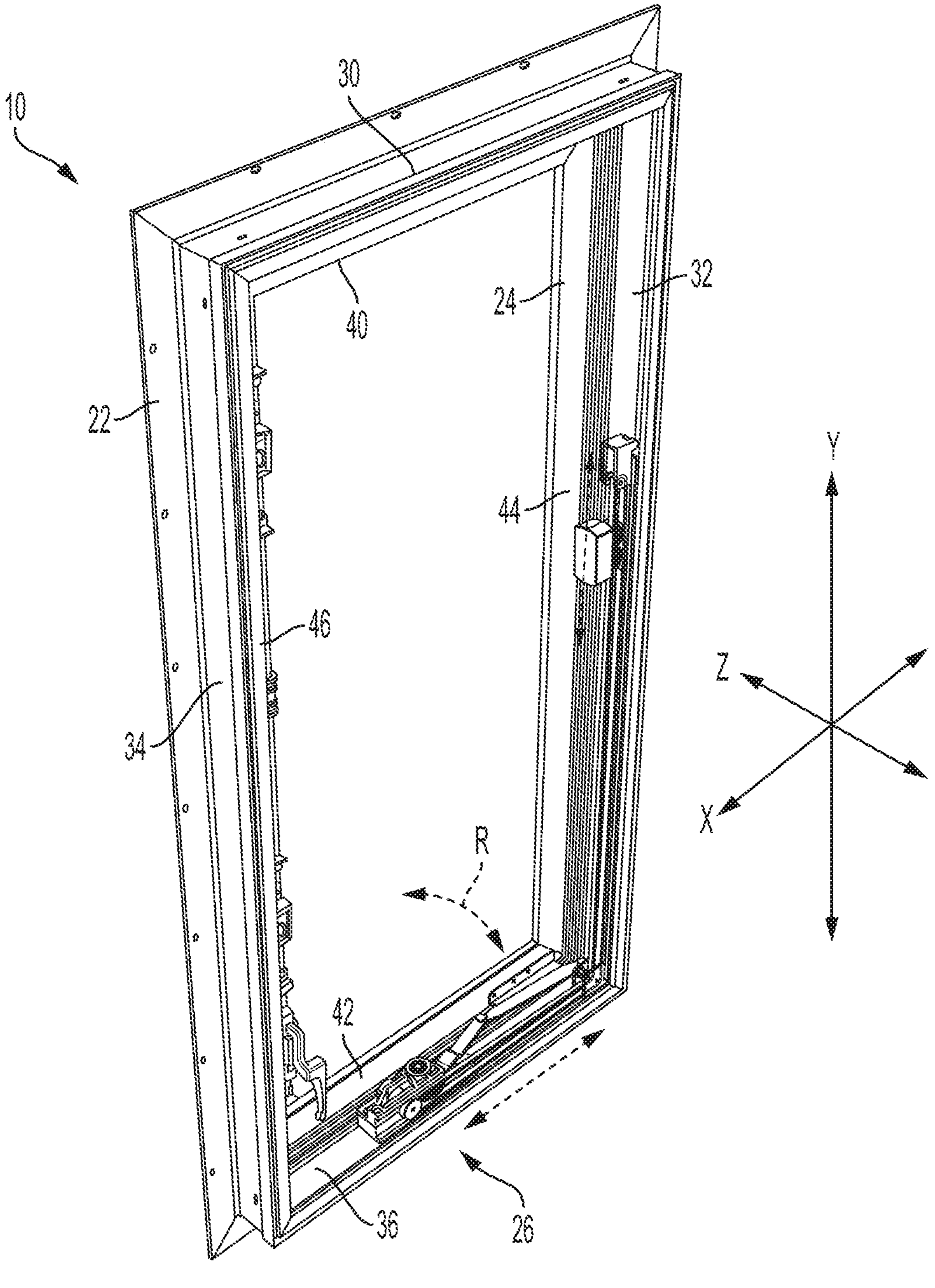
FIG. 1 is an isometric view of a casement fenestration unit, according to some examples.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

DETAILED DESCRIPTION

Definitions and Terminology

As the terms are used herein with respect to ranges of measurements "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

A coordinate system is presented in the Figures and referenced in the description in which the "Y" axis corresponds to a vertical direction, the "X" axis corresponds to a horizontal or lateral direction, and the "Z" axis corresponds to the interior/exterior direction.

Description of Various Embodiments

FIG. 1 is an isometric view of a fenestration unit 10, according to some examples. In terms of orientation, in the view of FIG. 1, the fenestration unit 10 is being viewed from an interior-facing side of the unit 10. As shown, the fenestration unit 10 includes a frame 22, a sash 24 hinged to the frame 22 such that the sash 24 is pivotable in an arcuate direction R between an open position and a closed position, and an operator assembly 26 configured to transition the sash 24 between the open and closed positions.

The frame 22 and sash 24 may be any of a variety of styles and designs, including casement-, awning-, or hopper-styles as previously described. In the example of FIG. 1, the frame 22 and sash 24 are configured in the casement-style arrangement. It should also be understood that the casement example of FIG. 1 can be rotated (e.g., clockwise) by 90 degrees to present an awning window configuration. Examples of suitable window frames and sashes that may be modified for use with the operator assembly 26 include those commercially available from Pella Corporation of Pella, IA under the tradename "IMPERVIA," although any of a variety of designs are contemplated.

As shown, the frame 22 has a head 30, a first jamb 32, a second jamb 34, and a sill 36. In turn, the sash 24 has a top rail 40, a bottom rail 42, a first stile 44 and a second stile 46. Glazing (e.g., an IG unit) is supported by the rails and stiles. When the fenestration unit 10 is in a closed configuration, the maximum viewing area presented through the fenestration unit 10 generally corresponds to the central area defined by the rails and stiles, unless some non-transparent feature of the glazing projects inwardly of the stiles and rails. As referenced above, in some examples the configuration of the operator assembly 26 helps avoid unnecessary protrusion into, or impingement of, the viewing area or other sightlines associated with the fenestration unit 10 (e.g., as compared to traditional crank handle designs).

Figure 2:
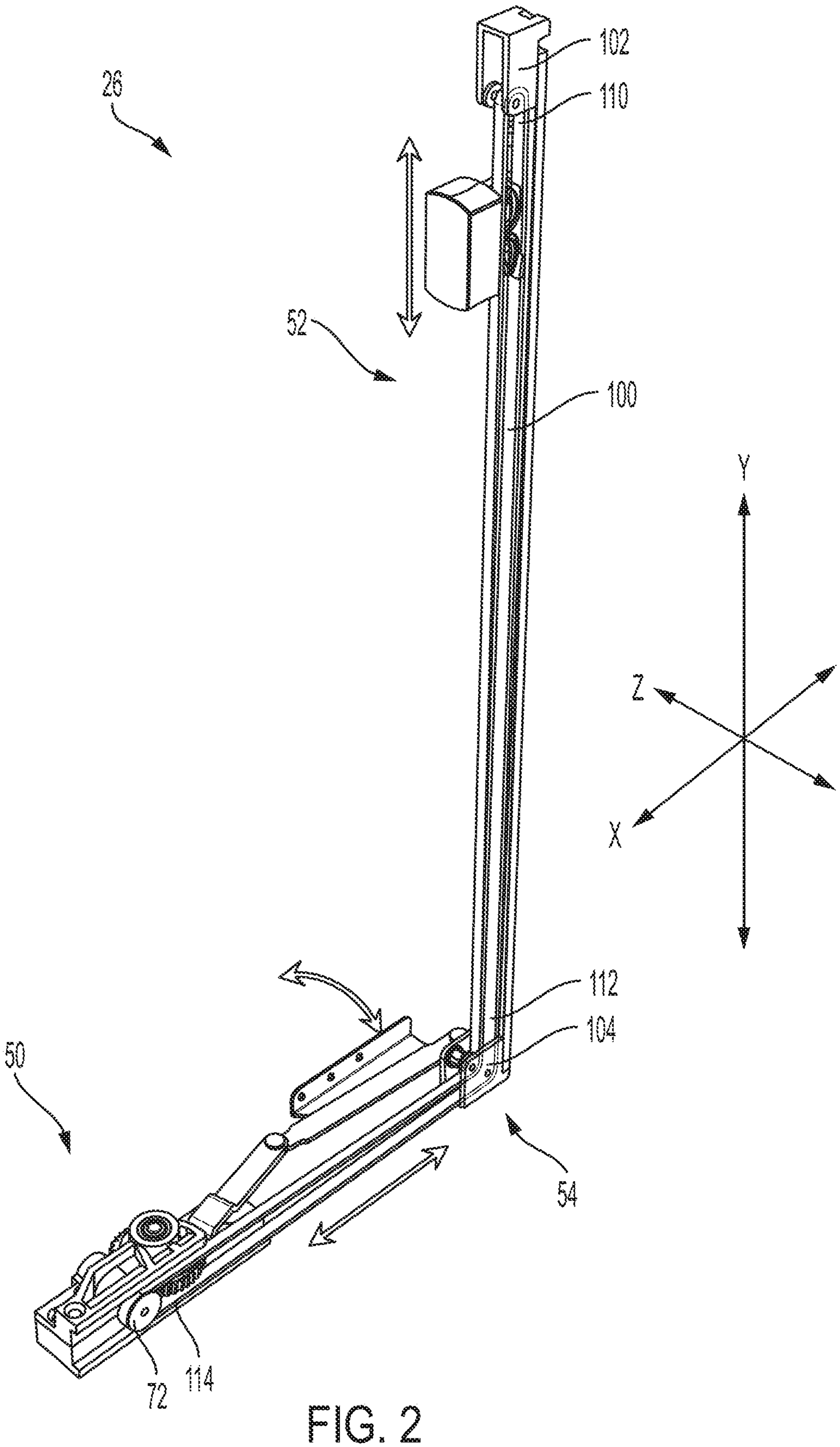
FIG. 2 is an isolated, isometric view of an operator assembly of the fenestration unit of FIG. 1, according to some examples.

FIG. 2 is an isolated, isometric view of the operator assembly 26 from FIG. 1. As shown, the operator assembly 26 includes a rotary drive mechanism 50, a slide mechanism 52, and a transfer mechanism 54 operatively coupling the slide and drive mechanisms. In general terms, the operator assembly 26 is configured to receive a first, linear input from a user of the fenestration unit 10 (FIG. 1) along a first axis (e.g., the Y- or vertical axis as shown in FIG. 2), which is then transferred along a second axis (e.g., the X- or horizontal axis as shown in FIG. 2) to cause the operator assembly 26 to impart an opening or closing force on the sash 24 (FIG. 1).

Figure 3:
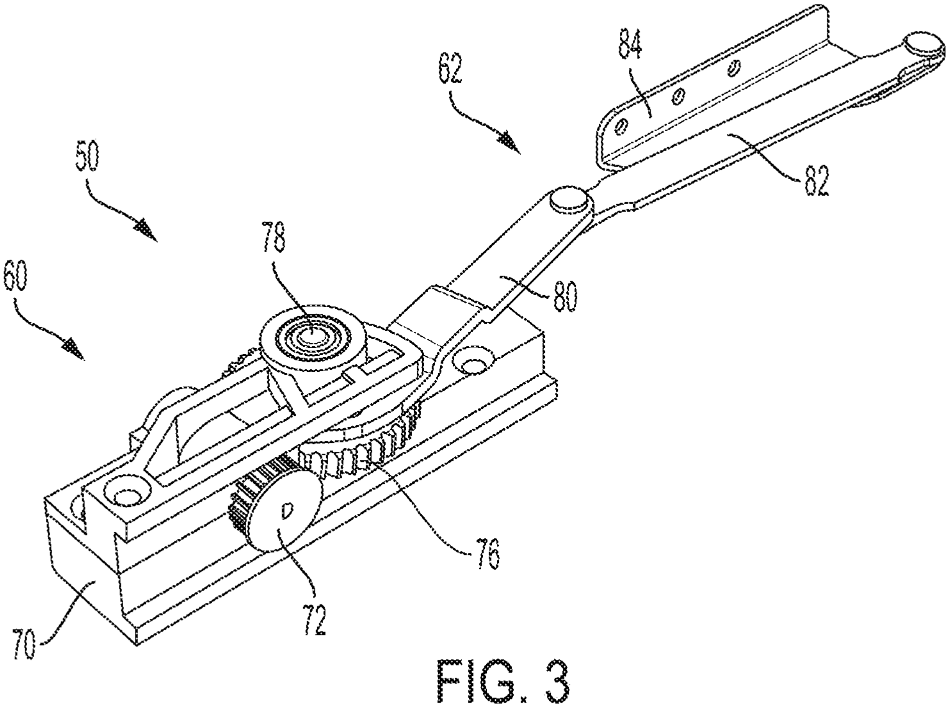
FIG. 3 is an isolated, isometric view of a drive mechanism of the fenestration unit of FIG. 1, according to some examples.

The drive mechanism 50 is configured to receive an input force (e.g., linear or rotational) from the slide mechanism 52 through the transfer mechanism 54 and to translate that input to into an opening force on the sash (FIG. 1) toward the open position and a closing force on the sash toward the closed position. FIG. 3 is an isolated, isometric view of the drive mechanism 50. As shown in FIG. 3, the drive mechanism 50 includes a rotary gearbox 60 and a linkage assembly 62.

Figure 4:
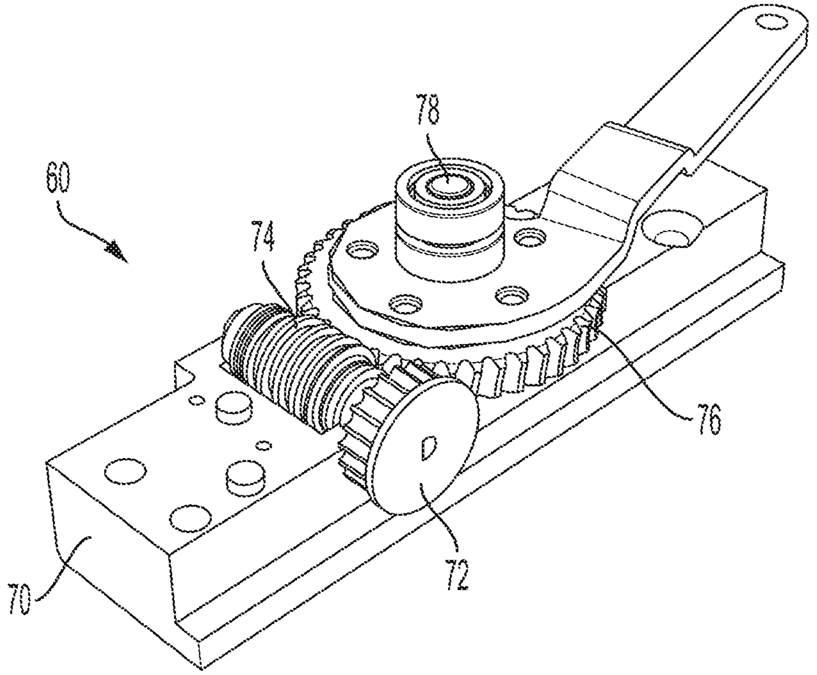
FIG. 4 shows a rotary gearbox of the drive mechanism of FIG. 3 with a portion of the gearbox removed and portions of a linkage assembly of the drive mechanism removed to better show features of the gearbox, according to some examples.

Generally, the rotary gearbox 60 receives an input force (e.g., linear) which is then translated into a rotational force onto the linkage assembly 62 to which the rotary gearbox 60 is operatively coupled. FIG. 4 shows the rotary gearbox 60 with a portion of the rotary gearbox 60 removed and portions of the linkage assembly 62 removed to better show features of the rotary gearbox 60. By referring between FIGS. 3 and 4, it can be seen that the rotary gearbox 60 includes a housing 70 (a top portion of which is removed in FIG. 4, leaving the base of the housing 70), a drive pulley 72, a worm 74, a worm gear 76, and a shaft 78. The drive pulley 72, worm 74, worm gear 76, and shaft 78 are generally maintained in operative engagement by the housing 70 and a plurality of bushings, bearings, and similar features that are not called out separately.

As shown, the drive pulley 72 may be configured with teeth or other surface features that assist with receiving an input force. The drive pulley 72 is configured to rotate (e.g., about the Z-axis) and is operatively coupled to the worm 74 to rotate the worm 74 (e.g., about the Z-axis). The worm 74 is a gear in the form of a screw with helical threading and is configured to engage with and rotate the worm gear 76 (e.g., about the Y-axis). Thus, the worm gear 76, which is similar to a spur gear, is rotatable via an input force on the drive pulley 72 causing the drive pulley 72 to rotate.

Figure 5:
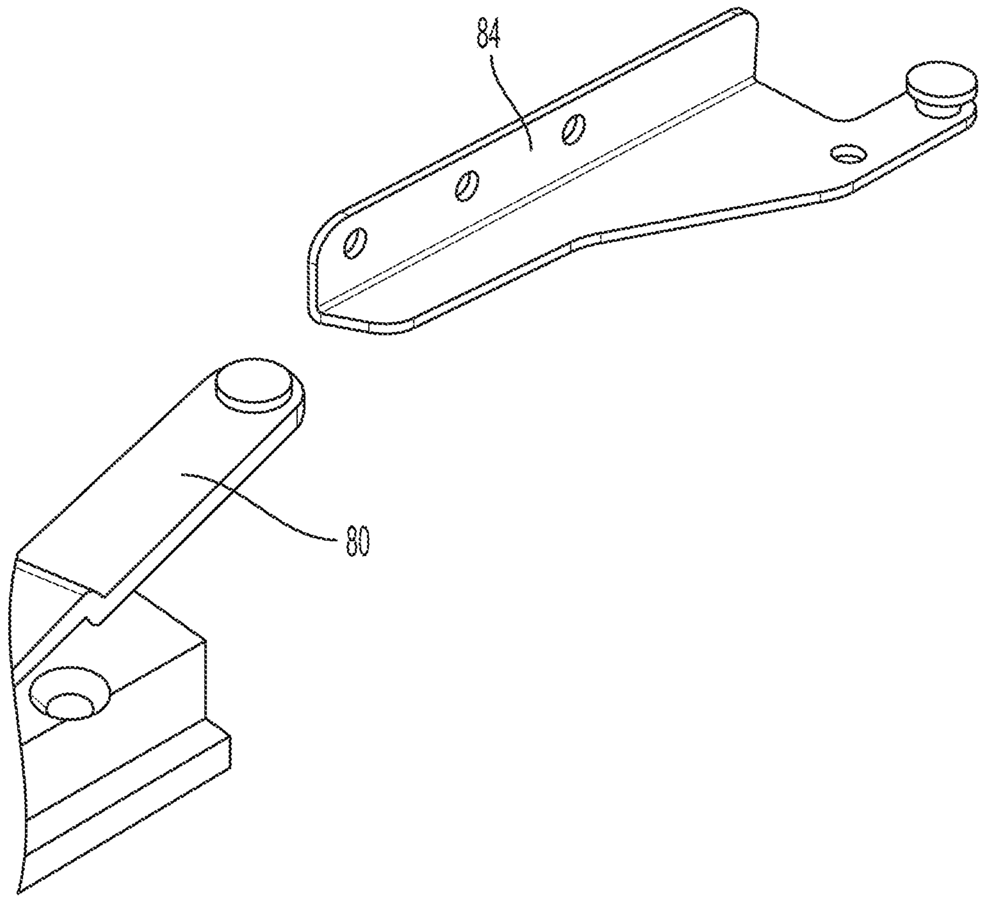
FIG. 5 shows a linkage assembly of the drive mechanism of FIG. 3 with a portion removed to better show its features, according to some examples.

FIG. 5 shows the linkage assembly 62 with a portion removed to better show its features. By referring between FIGS. 3 and 5, it can be seen that the linkage assembly 62 includes an arm 80, a link 82, and a sash brace 84. The arm 80 is coupled to the worm gear 76 such that rotation of the worm gear 76 imparts a rotational force on the arm 80. The link 82 couples the arm 80 and sash brace 84 (FIG. 5) such the rotational force on the arm 80 results in an opening or closing swing force in the X-Z plane on the sash brace 84. The opening or closing swing force is translated to the sash 24 by coupling the sash brace 84 to the sash 24 (e.g., at the bottom rail 42) according to the example of FIG. 1.

Figure 6:
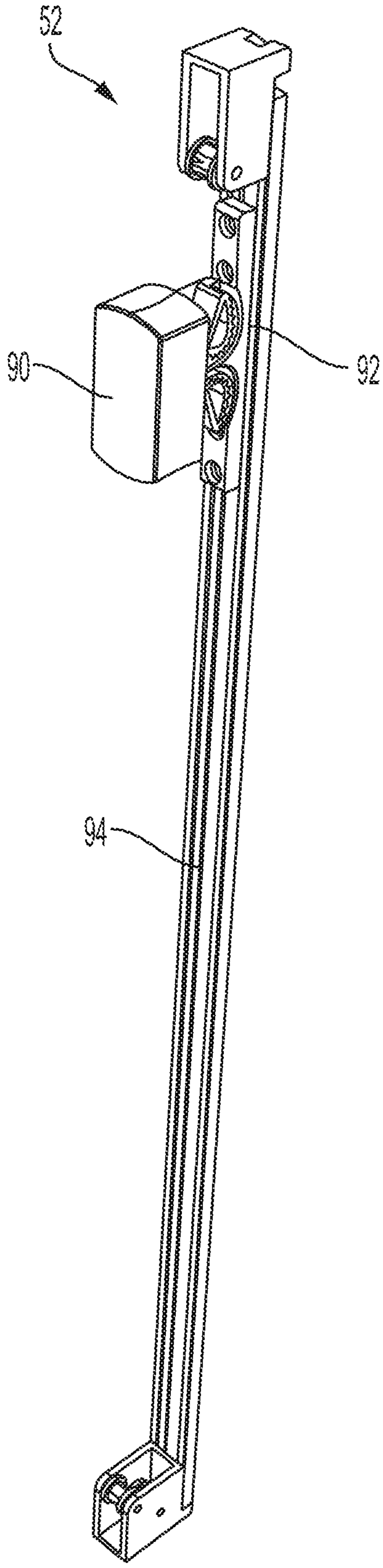
FIGS. 6, 7, and 8 are isolated isometric, side, and front views of a slide mechanism of the operator assembly of FIG. 2, according to some examples.
Figure 7:
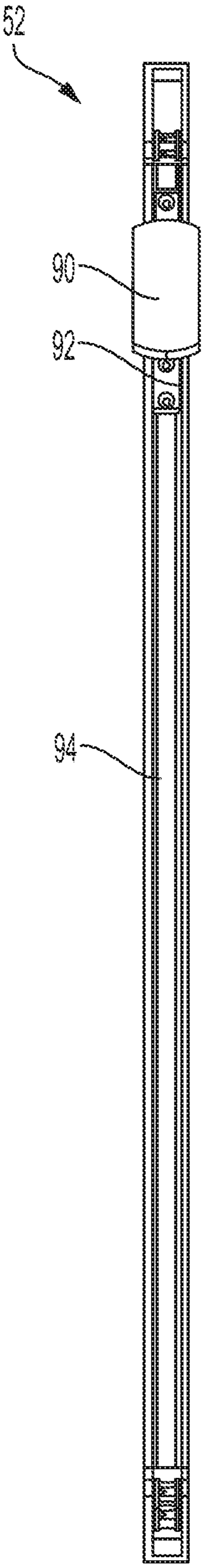
Figure 8:

FIGS. 6, 7, and 8 are isolated isometric, side, and front views of the slide mechanism 52. As shown, the slide mechanism 52 includes a handle 90, a slide member 92 coupled to the handle 90, and a linear rail 94 along which the slide member 92 is slidably received. As seen best in FIGS. 6 and 8, the slide member 92 also includes an attachment mechanism (e.g., ribbed teeth) for operatively coupling with the transfer mechanism 54. In various examples the linear rail 94 is associated with (e.g., attached to or integrally formed as part of) the frame 22, such as the first jamb 32 (FIG. 1). In this manner, a user is able to grasp the handle 90 of the slide mechanism 52 and slide the slide member 92 linearly (e.g., vertically) along the first jamb 32. As subsequently described, this linear motion is translated through the transfer mechanism 54 to the drive mechanism 50. As shown in FIG. 1, the handle 90 is arranged to project inwardly toward the center of the fenestration unit 10, although the handle 90 can also be modified to project interiorly, from the interior side of the fenestration unit 10.

Figure 9:
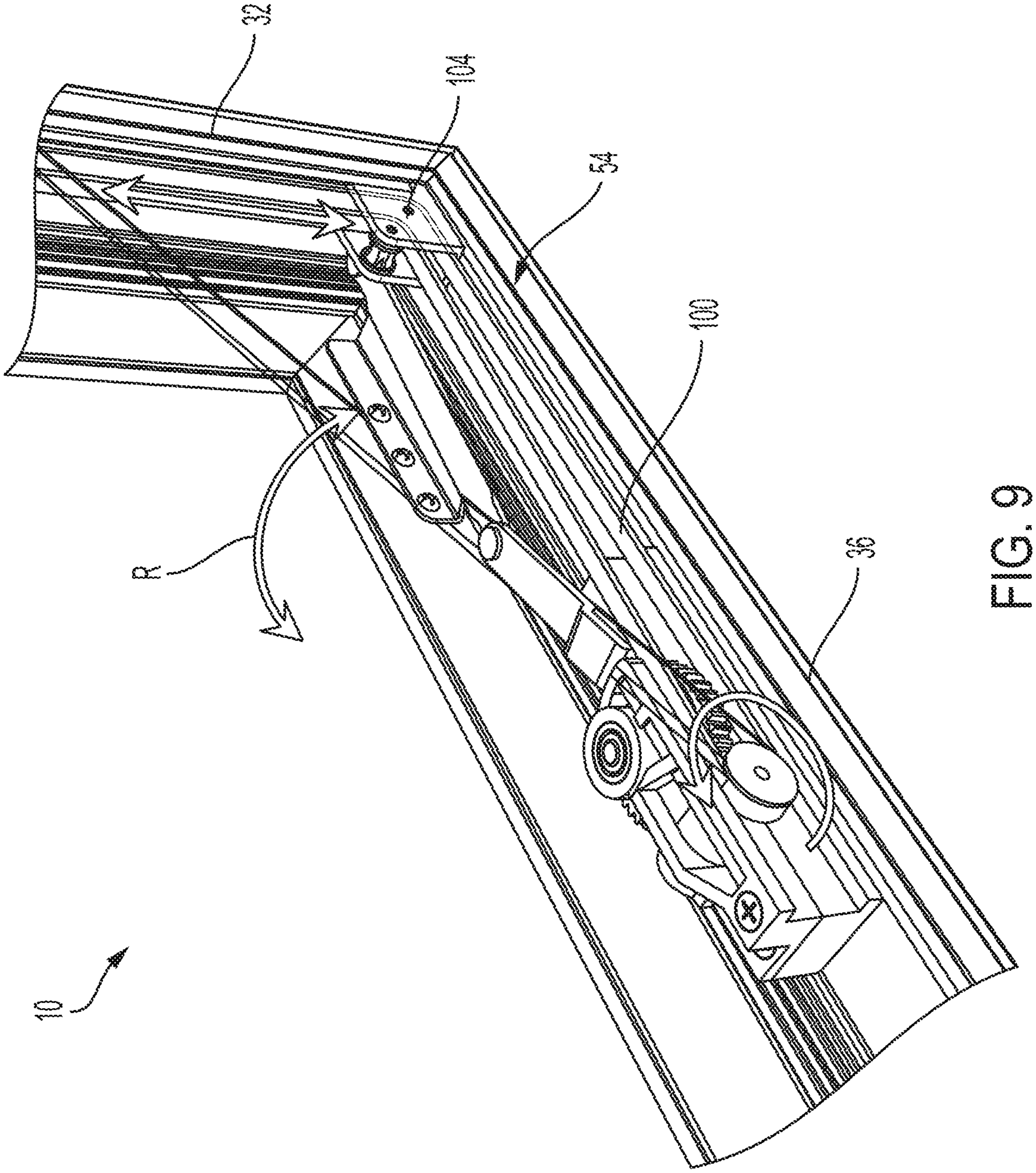
FIG. 9 is an enlarged view of a corner of the fenestration unit of FIG. 1, according to some examples.

FIG. 9 is an enlarged view of a corner of the fenestration unit 10, according to some examples. With reference to FIG. 9 and back to FIG. 2, the transfer mechanism 54 is shown to include a drive belt 100 and a first transfer block 102 and a second transfer block 104. The drive belt 100 is generally a ribbed or toothed belt that is flexible and resilient. The first transfer block 102 includes a pulley system that the drive belt 100 is able to travel around and reverse direction. As shown, the first transfer block 102 is located along the first jamb 32 toward the head 30 (FIG. 1). The second transfer block 104 also includes a pulley system (e.g., a dual pulley system) and is configured to redirect the drive belt 100 direction of travel from a generally horizontal path, axis, or direction to a generally vertical path, axis, or direction. The second transfer block 104 is located toward a corner of the fenestration unit 10 (e.g., toward an intersection of the first jamb 32 and the sill 36 shown in FIG. 1).

As shown in FIG. 2, the drive belt has a first portion 110 looped around the first transfer block 102, an intermediate portion 112 looped past the second transfer block, and a second portion 114 looped around the drive pulley 72. The ends of the drive belt 100 are secured to the slide member 92. In this manner the drive belt extends along the first jamb 32 and then along the sill 36 in a continuous loop. As shown, the drive belt 100 is coupled to the slide member 92 using the attachment mechanism (e.g., ribbed teeth). In operation, the handle 90 is slid along a first axis (e.g., upwardly or downwardly along the Y-axis), resulting in the drive belt 100 being driven along the Y-axis and then along the X-axis through a generally perpendicular path, which then results in turning of the drive pulley 72. As previously referenced, actuation of the drive pulley (e.g., by imparting an actuation force through the drive belt 100) causes the drive mechanism 50 to open and close the sash. In other words, the slide mechanism 52 is operatively coupled to the drive mechanism 50 via the transfer mechanism 54, the slide mechanism being slidable to cause the drive mechanism to impart the opening force and the closing force, respectively, on the sash 24.

Figure 10:
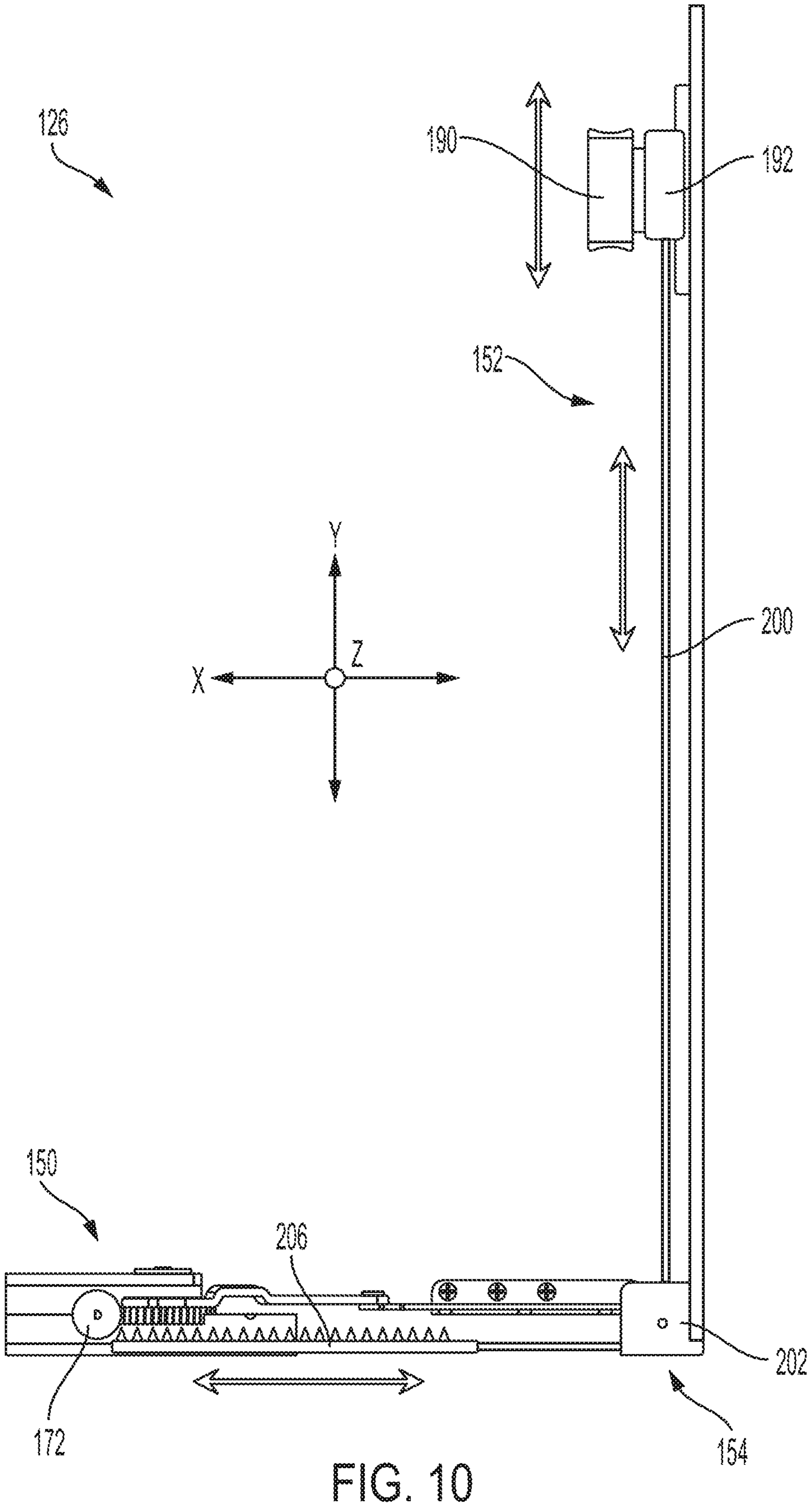
FIG. 10 shows an example of another operator assembly optionally utilized with the frame and sash of the fenestration unit of FIG. 1, according to some examples.

FIG. 10 shows an example of another operator assembly 126 optionally utilized with the frame 22 and sash 24 of the fenestration unit 10 (FIG. 1). Generally, the operator assembly 126 can operate similarly to and includes similar components as the operator assembly 26, with some alternative features described below.

As shown in FIG. 10, the operator assembly 126 includes a drive mechanism 150, a slide mechanism 152, and a transfer mechanism 154 operatively coupling the slide and drive mechanisms. The drive mechanism 150 can be essentially the same as the drive mechanism 50, with the exception that the drive pulley 172 is modified or otherwise configured to interact with a rack-type drive of the transfer mechanism 154 (e.g., as opposed to a drive belt), as subsequently described.

The slide mechanism 152 is also largely the same as the slide mechanism 52, with the exception that rather than being configured to be secured to a drive belt, the slide mechanism is configured to be secured to a drive member, as subsequently described.

In terms of components, the transfer mechanism 154 differs most significantly from those of the operator assembly 26, although the function is largely the same. In particular, the transfer mechanism 154 includes a drive member 200, a transfer block 202, and a rack member 206. The drive member 200 is optionally a flexible band or ribbon of material (e.g., similar to a metallic tape member) that has sufficient column strength while being laterally flexible. The transfer block 202 optionally includes a pulley system or a pin system around which the drive member 200 bends and is directed from a first vertical orientation to a second lateral, or horizontal direction. The first end of the drive member 200 is coupled to the slide mechanism 152 and the second end of the drive member 200 is coupled to the rack member 206. The rack member 206, in turn, is configured to interact with the drive pulley 172 of the drive mechanism to impart a rotational force on the drive pulley 172.

In particular, the drive member 200 has sufficient column strength or is otherwise designed (e.g., supported along the edges) to prevent buckling to permit the slide mechanism 152 to impart a vertical force (e.g., downward force) on the drive member which is translated from the first axis (e.g., Y-axis) generally perpendicularly to a second axis (e.g., X-axis) causing the rack member 206 to impart a motion, and more specifically rotate, the drive pulley 172. In various examples, the rotation of drive pulley 172 results in the drive mechanism 150 imparting an opening or closing force on the sash 24 (where additionally moving the slide mechanism 152 in the opposite direction retracts the drive member 200 and thus the rack member 206 causing the opposite opening/closing operation on the sash 24).

Figure 11:
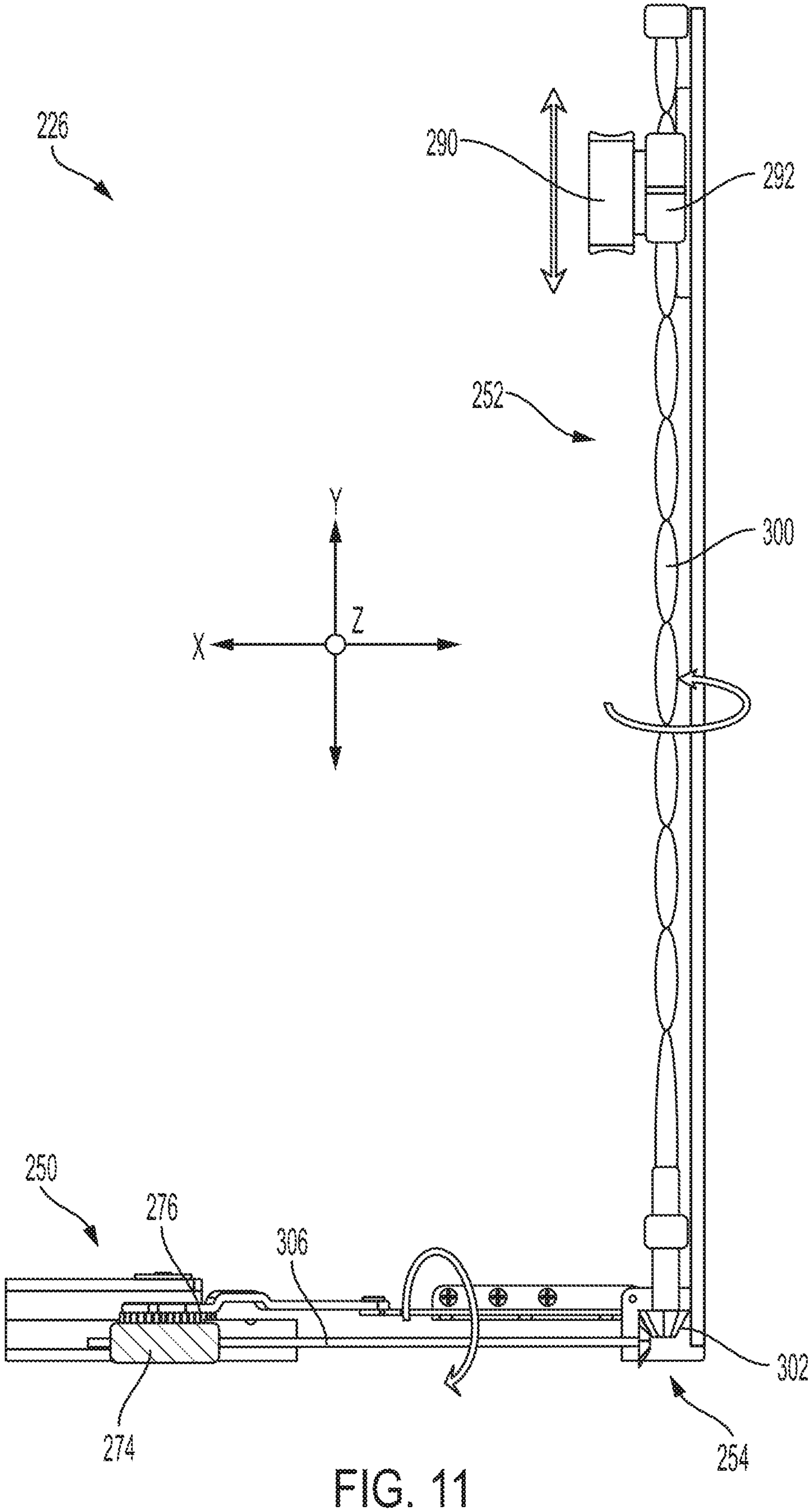
FIG. 11 shows another example of another operator assembly optionally utilized with the frame and sash of the fenestration unit of FIG. 1, according to some examples.

FIG. 11 shows another example of an alternative operator assembly 226 optionally utilized with the frame 22 and sash 24 of the fenestration unit 10 (FIG. 1). Generally, the operator assembly 226 can operate similarly to and includes similar components as the operator assembly 26, with some alternative features described below.

In general terms, the operator assembly 226 of FIG. 11 is a twisted wire or twisted band drive system. The twisted wire 300 may include a tape-like or band-like member that is twisted to define a desired number of turns, or twists at a desired frequency. As shown, the operator assembly 226 includes a jamb-mounted twisted wire 300 that is free to rotate and configured to convert linear motion of a slide mechanism 292 into rotary motion of the twisted wire 300. In some examples, a right-angled mitered gearbox is utilized to facilitate the transfer of the twisted wire rotary motion around the jamb-to-sill corner where a rotary shaft transmits torque to a lateral, horizontal (rotary axis in x-direction) worm which in turn interacts with a worm gear to rotate the drive arm that is connected to the vent sash via linkages. In some further examples, the twisted wire 300 may be coupled to a pulley or other drive mechanism to drive a belt, cable, cord, or tape/ribbon across another portion of the frame (e.g., the sill or head) to a drive mechanism. The drive mechanism can either be rotationally driven, as illustrated previously, or may be driven through use of an additional sliding member interacting with a plurality of linkage members (e.g., such as those previously described).

In terms similar to those utilized in the prior examples, the operator assembly 226 includes a drive mechanism 250, a slide mechanism 252, and a transfer mechanism 254 operatively coupling the slide and drive mechanisms. The drive mechanism 250 is similar to the drive mechanism 50, with the exception that the drive pulley is not necessarily present and the worm 274 is mounted directly to the transfer mechanism 254, as subsequently described.

The slide mechanism 252 is largely the same as the slide mechanism 52, with the exception that rather than being configured to be secured to a drive belt, the slide mechanism 252 is coupled to a drive member 300 such that the slide mechanism is slidably received over a drive member and, as the slide mechanism 252 slides axially along the drive member, the drive member is rotated.

As shown, the transfer mechanism 254 includes a first drive member 300 in the form of a twisted wire or band, a first transfer block 302 in the form of a right-angle mitered gearbox, and a second drive member 306 in the form of a drive rod.

The first drive member 300 is optionally formed by twisting a band of material (e.g., a metallic band) to get a helical configuration. The rate, or number of twists/per unit length may be varied to achieve a desired opening/closing force and rate profile. For example, it may be desirable to begin the opening sequence relatively slowly and thus a relative low rate of turn may be desirable in the band with the number of turns, or twists increasing along the length of the band to result in a faster opening rate. The first drive member 300 is optionally mounted to the first jamb 32 (FIG. 1) such that the slide member is free to rotate (e.g., about the Y-axis). Though not shown in detail, the slide mechanism 252, and in particular the slide member 292 includes a slot or channel such that as the slide member 292 travels along the first drive member 300 the first drive member 300 is rotated.

In turn, the second drive member 306 is secured to the sill 36 (FIG. 1) such that the second drive member 306 is free to rotate (e.g., about the X-axis). The torque from the first drive member 300 is transferred to the second drive member 306 through the transfer block 302 which is configured as a right-angle gear box connected to respective portions of the first and second drive members. The worm 274 of the drive mechanism 250 is shown coupled directly to the second drive member 306 such that the rotation of the second drive member 306 via sliding of the slide member 292 over drive member 300 results in rotation of the worm 274. The worm 274 is engaged with the worm gear 276 such that turning of the worm 274 results in turning of the worm gear 276. The remainder of operation of the drive mechanism 250 proceeds in a similar manner to the examples previously described (e.g., similarly to operator assembly 26 or operator assembly 126).

Figure 12:
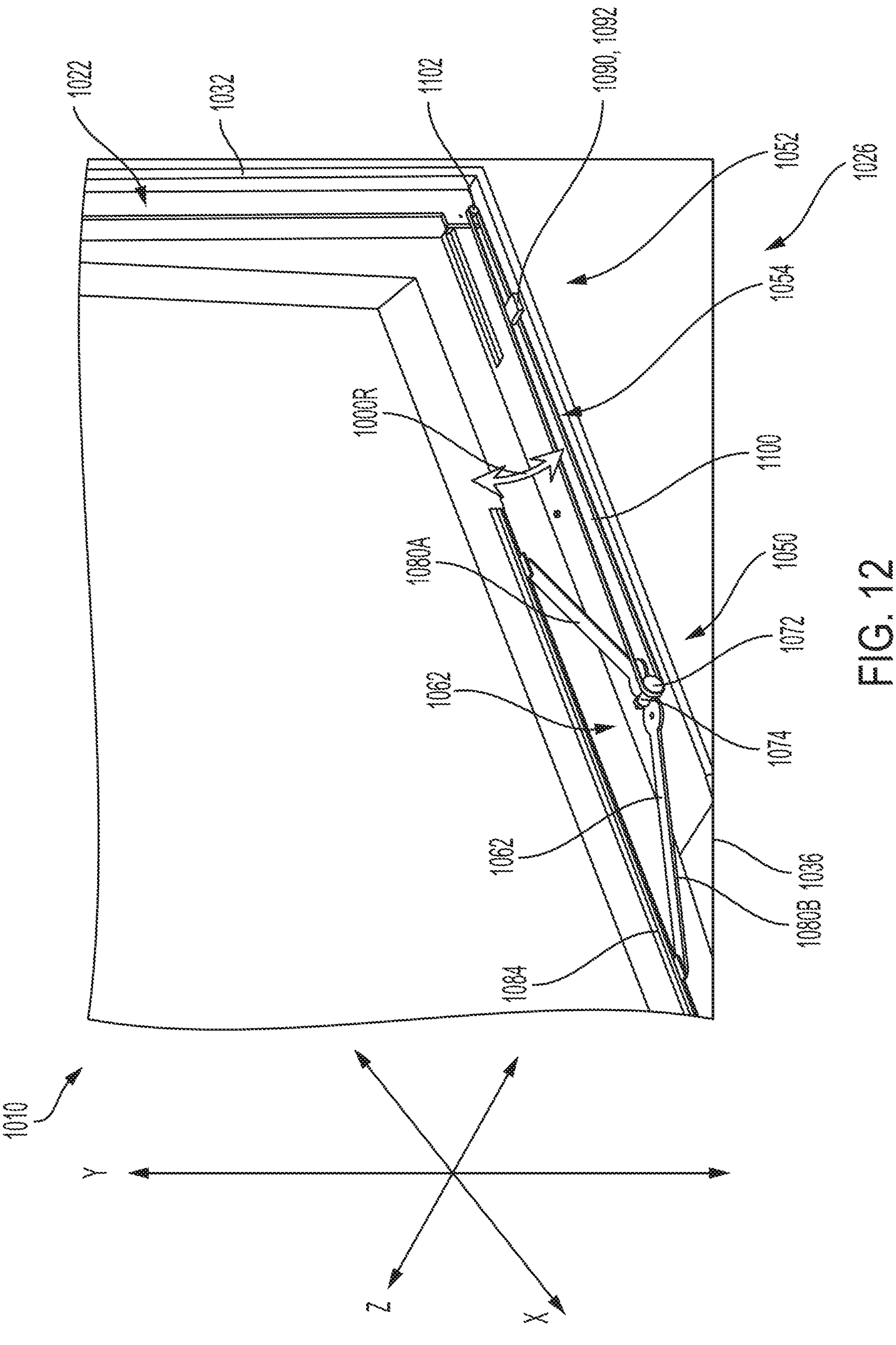
FIG. 12 shows an awning fenestration unit, according to some embodiments.

FIG. 12 is an isometric view of a portion of another fenestration unit 1010, according to some examples. In terms of orientation, in the view of FIG. 12, the fenestration unit 1010 is being viewed from an interior-facing side of the unit 1010 toward an intersection of a sill 1036 and a jamb 1032 of a frame 1022. The head and other jamb (as well as the remainders of the sill 1036 and jamb 1032) are not shown but should be readily understood. The fenestration unit 1010 is configured as an awning window, where a sash 1024 of the fenestration unit 1010 is hinged to the head (not shown) and is pivotable in an arcuate direction 1000R between an open position and a closed position. As with other examples, the fenestration unit 1010 includes an operator assembly 1026 configured to transition the sash 1024 between the open and closed positions.

As shown, the operator assembly 1026 includes a rotary drive mechanism 1050, a slide mechanism 1052, and a transfer mechanism 1054 operatively coupling the slide and drive mechanisms. In general terms, the operator assembly 1026 is configured to receive a first, linear input from a user of the fenestration unit 1010 along a first axis (e.g., the X- or horizontal axis as shown in FIG. 12), which is then transferred along that first axis (e.g., the X- or horizontal axis as shown in FIG. 12) to cause the operator assembly 1026 to impart an opening or closing force on the sash 1024 (FIG. 12).

As shown in FIG. 12, the drive mechanism 1050 includes a rotary gearbox 1060 and a linkage assembly 1062. Generally, the rotary gearbox 1060 receives an input force (e.g., linear) which is then translated into a rotational force on the linkage assembly 1062 to which the rotary gearbox 1060 is operatively coupled. As shown, the rotary gearbox 1060 includes a drive pulley 1072 and a worm 1074, or helical gear, coupled to the drive pulley 1072. The drive pulley 1072 and worm 1074 are maintained in operative engagement by any of a variety of features, including bushings, bearings, or the like that are not called out separately.

Similarly, to other examples, the drive pulley 1072 may be configured with teeth or other surface features that assist with receiving an input force. The drive pulley 1072 is configured to rotate (e.g., about the Z-axis) and is operatively coupled to the worm 1074 to rotate the worm 1074 (e.g., about the Z-axis). The worm 1074 is a gear in the form of a screw with helical threading and is configured to engage with and rotate a portion of the linkage assembly 1062 (e.g., about the Y-axis). Thus, the worm gear 76, which is similar to a spur gear, is rotatable via an input force on the drive pulley 1072 causing the drive pulley 1072 to rotate.

As shown in FIG. 12, the linkage assembly 1062 includes a first arm 1080A, a second arm 1080B, and a sash brace 1084. The first and second arms 1080A, 1080B are each operatively coupled to the worm gear 1076 such that rotation of the worm gear 1076 imparts a rotational force on each of the arms 1080A, 1080B. The arms 1080A and 1080B are each slidably coupled to the sash brace 1084 such the rotational force on the arms 1080A, 1080B results in an opening or closing swing force in the Y-Z plane on the sash brace 1084. The opening or closing swing force is translated to the sash 1024 by coupling the sash brace 1084 to the sash 1024 (e.g., toward the bottom of the sash 1024) according to the example of FIG. 12.

As shown in FIG. 12, the slide mechanism 1052 includes a handle 1090 and slide member 1092 operatively coupled to the transfer mechanism 1054. The slide member 1092 also includes an attachment mechanism (e.g., ribbed teeth) for operatively coupling with the transfer mechanism 1054. In various examples the slide mechanism includes a linear rail (not shown) associated with (e.g., attached to or integrally formed as part of) the frame 1022, such as the sill 1036. In this manner, a user is able to grasp the handle 1090 of the slide mechanism 1052 and slide the slide member 1092 linearly (e.g., horizontally) along the sill 1036. As subsequently described, this linear motion is translated through the transfer mechanism 1054 to the drive mechanism 1050. As shown in FIG. 12, the handle 1090 is arranged to project inwardly toward the center of the fenestration unit 1010, although the handle 1090 can also be modified to project interiorly, from the interior side of the fenestration unit 1010.

With reference to FIG. 12, the transfer mechanism 1054 is shown to include a drive belt 1100 and a first transfer block 1102. The drive belt 1100 is generally a ribbed or toothed belt that is flexible and resilient. The first transfer block 1102 includes a pulley system that the drive belt 1100 is able to travel around and reverse direction. As shown, the first transfer block 1102 is located toward the corner between the first jamb 1032 and the sill 1036. As shown, the drive belt 1100 has a first portion looped around the first transfer block 1102 and a second portion looped around the drive pulley 1072. A portion (e.g., the ends) of the drive belt 1100 are secured to the slide member 1092. In this manner the drive belt 1100 extends along the sill 1036 in a continuous loop.

In operation, the handle 1090 is slid along a first axis (e.g., horizontally along the X-axis), resulting in the drive belt 1100 being driven along the X-axis which then results in turning of the drive pulley 1072. As previously referenced, actuation of the drive pulley (e.g., by imparting an actuation force through the drive belt 1100) causes the drive mechanism 1050 to open and close the sash 1024. In other words, the slide mechanism 1052 is operatively coupled to the drive mechanism 1050 via the transfer mechanism 1054, the slide mechanism being slidable to cause the drive mechanism to impart the opening force and the closing force, respectively, on the sash 1024.

From the foregoing, associated methods of making a fenestration unit, including arranging, associating, and/or coupling parts in the manner described and associated methods of operating a fenestration unit including causing the sash to open and close in the manner described, are contemplated and will be readily apparent.

Inventive concepts of this application have been described above both generically and with regard to specific embodiments/examples. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A fenestration unit comprising:

a frame having a head, a first jamb, a second jamb, and a sill;

a sash hinged to the frame such that the sash is pivotable between an open position and a closed position; and an operator assembly configured to transition the sash between the open and closed positions, the operator assembly including, a rotary drive mechanism configured to rotate to impart an opening force on the sash toward the open position and a closing force on the sash toward the closed position, and a slide mechanism operatively coupled to the drive mechanism, the slide mechanism being slidable to cause the drive mechanism to impart the opening force and the closing force, respectively, on the sash, the slide mechanism being associated with the frame and including a handle that is linearly slidable along the frame; and a transfer mechanism operatively coupling the slide and drive mechanisms such that a first, linear input to the handle of the slide mechanism along a first axis is transferred along a second axis as a linear input force on the rotary drive mechanism.

2. The fenestration unit of claim 1, wherein the slide mechanism is slidable along the first axis resulting in an actuation force on the rotary drive mechanism to impart the opening force and the closing force, respectively, on the sash, wherein the resultant actuation force is along the second axis which is at an angle to the first axis.

3. The fenestration unit of claim 2, wherein the first and second axes are generally perpendicular.

4. The fenestration unit of claim 1, wherein the first and second axes are generally perpendicular.

5. The fenestration unit of claim 1, wherein the rotary drive mechanism includes a component that rotates about a longitudinal axis that is perpendicular to the second axis.

6. The fenestration unit of claim 5, wherein the component that rotates about the longitudinal axis comprises a worm.

7. The fenestration unit of claim 6, wherein the component that rotates about the longitudinal axis comprises a drive pully coupled to the worm.

8. A fenestration unit comprising:

a frame;

a sash hinged to the frame; and an operator assembly including:

a rotary drive mechanism operable to rotate to impart an opening force on the sash;

a slide mechanism operatively coupled to the rotary drive mechanism, the slide mechanism being linearly actuatable to cause the rotary drive mechanism to impart the opening force on the sash; and a transfer mechanism operatively coupling the slide and rotary drive mechanisms such that a first, linear input of the slide mechanism is translated in a different direction as a second, linear input on the rotary drive mechanism.

9. The fenestration unit of claim 8, wherein the slide mechanism is slidable along a first axis corresponding to a direction of the first, linear input.

10. The fenestration unit of claim 9, wherein the first linear, input and the second, linear input are generally perpendicular.

11. The fenestration unit of claim 10, wherein the slide mechanism includes a linearly translatable handle that is slidable relative to the frame.

12. The fenestration unit of claim 8, wherein the rotary drive mechanism includes a component that rotates about a longitudinal axis that is perpendicular to the direction of the second linear input.

13. The fenestration unit of claim 12, wherein the component that rotates about the longitudinal axis comprises a worm.

14. The fenestration unit of claim 13, wherein the component that rotates about the longitudinal axis comprises a drive pully coupled to the worm.

* * * * *